United States Patent
Onello et al.

(10) Patent No.: US 8,359,949 B2
(45) Date of Patent: Jan. 29, 2013

(54) HAMMER HEAD AND HANDLE ASSEMBLY

(75) Inventors: Timothy Scott Onello, Murfreesboro, TN (US); Charles Weber, Onalaska, WI (US)

(73) Assignee: Walter Meier (Manufacturing) Inc., La Vergne, TN (US)

( * ) Notice: Subject to any disclaimer, the term of this patent is extended or adjusted under 35 U.S.C. 154(b) by 4 days.

(21) Appl. No.: 13/093,540

(22) Filed: Apr. 25, 2011

(65) Prior Publication Data

US 2012/0266726 A1    Oct. 25, 2012

(51) Int. Cl.
 *B25D 1/00*    (2006.01)
 *B25G 1/00*    (2006.01)
(52) U.S. Cl. .............................................. 81/22; 81/20
(58) Field of Classification Search ............... 81/20–22, 81/26, 489; 16/110.1
See application file for complete search history.

(56) References Cited

U.S. PATENT DOCUMENTS

| | | | | |
|---|---|---|---|---|
| 1,515,708 A | * | 11/1924 | Stolle | 254/26 R |
| 4,172,483 A | * | 10/1979 | Bereskin | 81/20 |
| 4,331,193 A | | 5/1982 | Tudisco | |
| 4,404,708 A | * | 9/1983 | Winter | 16/110.1 |
| 4,683,784 A | * | 8/1987 | Lamont | 81/22 |
| 5,280,739 A | * | 1/1994 | Liou | 81/22 |
| 6,332,376 B1 | * | 12/2001 | Hurley | 81/23 |
| 6,418,820 B1 | * | 7/2002 | Lamond et al. | 81/177.1 |
| D519,814 S | * | 5/2006 | Hung | D8/78 |
| D574,690 S | * | 8/2008 | Chen | D8/78 |
| 2006/0254391 A1 | * | 11/2006 | Norton | 81/22 |
| 2010/0199809 A1 | * | 8/2010 | St. John et al. | 81/20 |

FOREIGN PATENT DOCUMENTS

| | | |
|---|---|---|
| EP | 0005635 | 11/1979 |
| EP | 0207786 | 1/1987 |
| GB | 2053771 | 2/1981 |

OTHER PUBLICATIONS

European Search Report dated Jul. 30, 2012, 7 pgs.
Wilton—Striking Tools Catalog, wiltontool.com, Jan. 2011, 16 pages.

* cited by examiner

*Primary Examiner* — David B Thomas
(74) *Attorney, Agent, or Firm* — Schiff Hardin LLP

(57) ABSTRACT

A hammer or other hand tool has a head to which is attached a handle. The handle has a plurality of spring steel rods extending substantially the length of the handle and extending into the head where the rods are affixed by a plate. Spacer plates with holes are positioned at spaced locations along the rods. The rods and spacer plates are encased in a rubber material that forms the outer surface of the handle. The rods and spacer plates at the end of the handle form a reinforced lanyard hole. A collar is formed on the handle adjacent the head. The head of the hammer has angled deflecting pads adjacent the striking faces. A raised rim on the head opposite the handle forms a stand surface to enable the barrel shaped head to stand with the handle projecting upwardly.

26 Claims, 5 Drawing Sheets

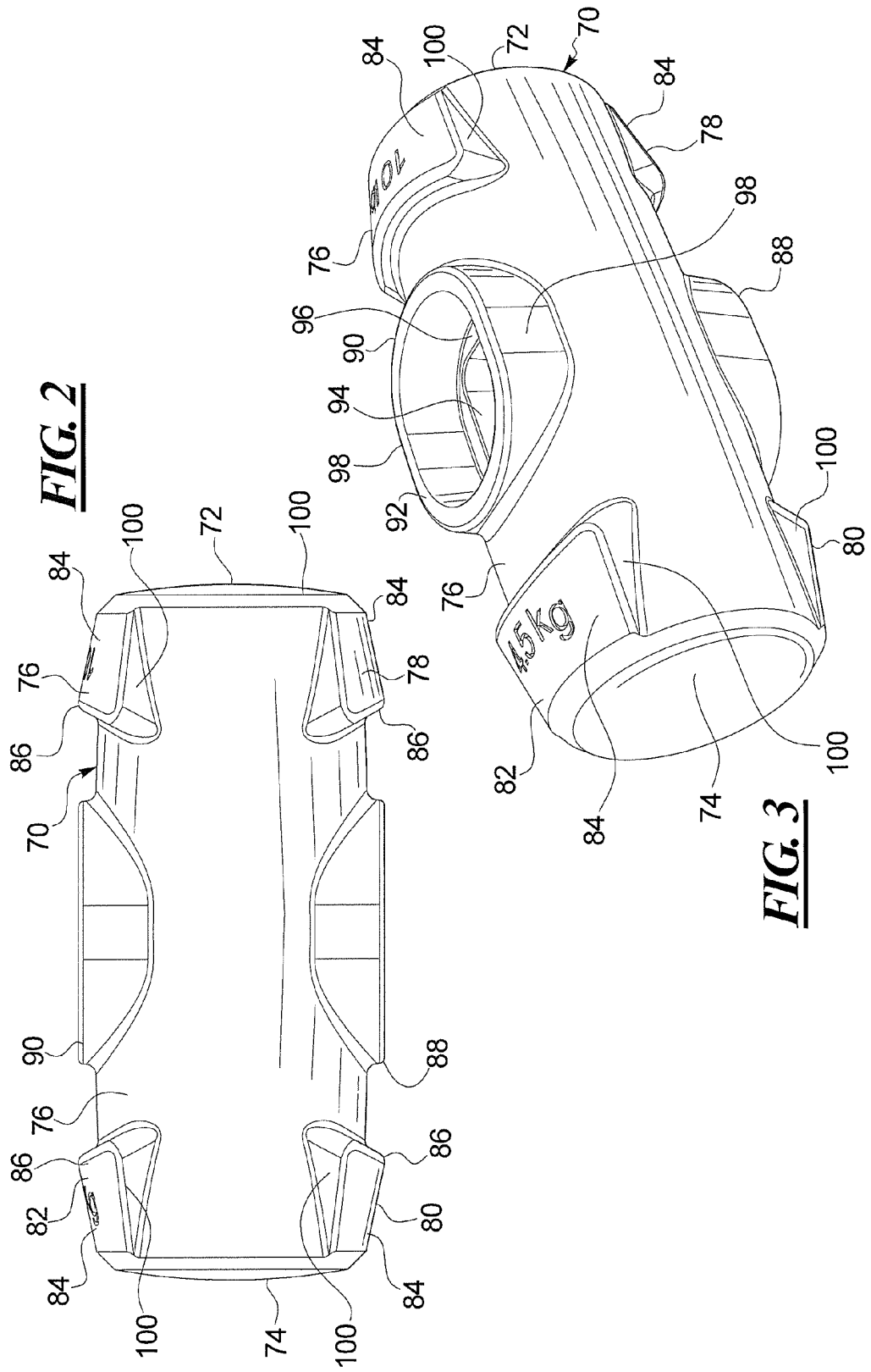

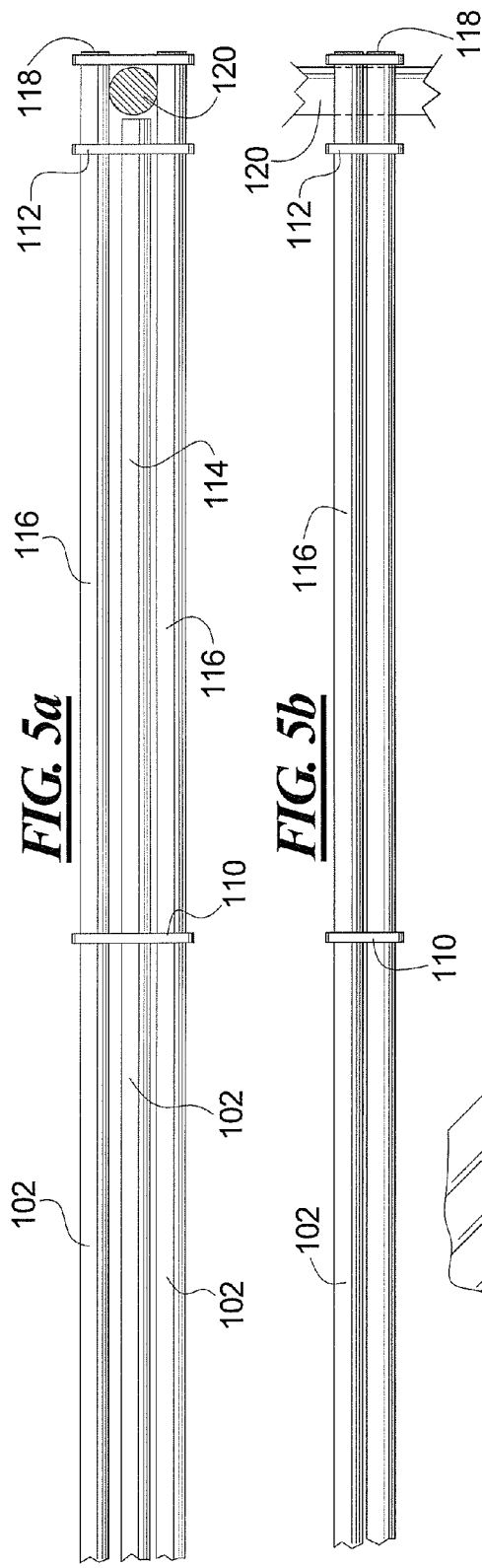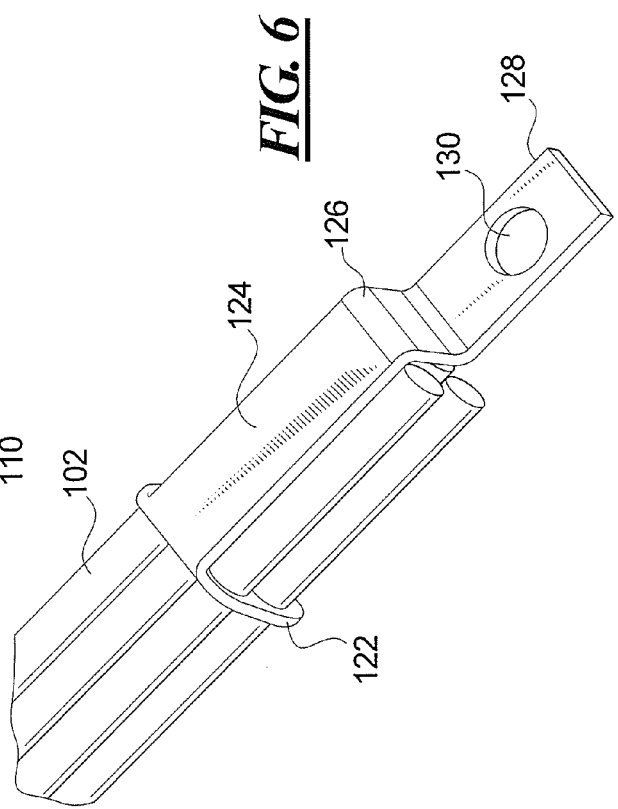

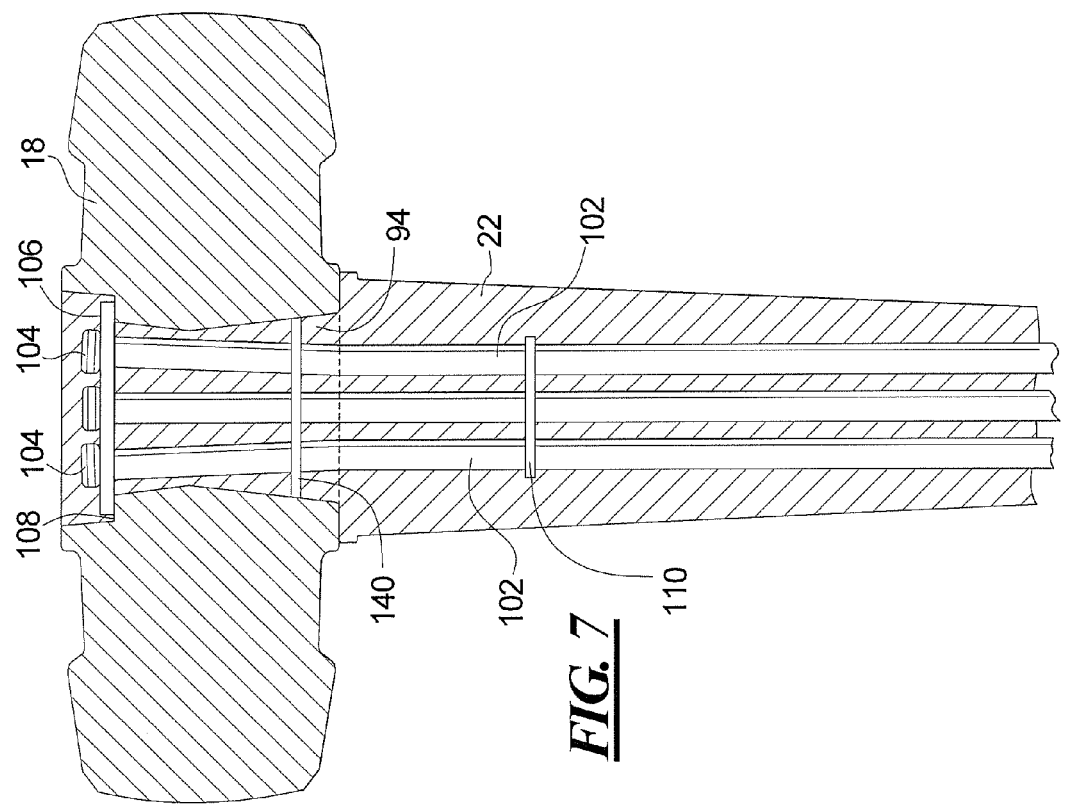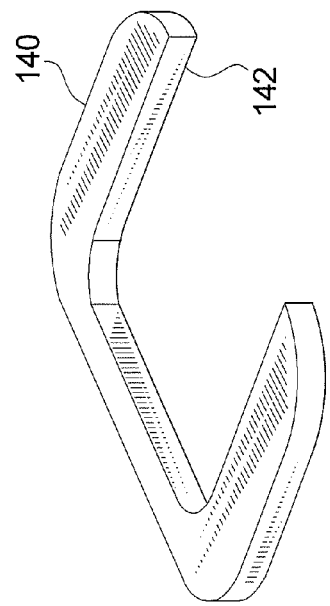

HAMMER HEAD AND HANDLE ASSEMBLY

BACKGROUND OF THE INVENTION

1. Field of the Invention

The present invention relates generally to a hammer or other striking tool, and more particularly to hammer and handle assembly.

2. Description of the Related Art

Hammers are common tools used in a variety of trades as well as by craftspersons, hobbyists, persons doing home repairs, and many others. Heavy duty hammers with relatively large and heavy heads are used for heavy work. Such heavy work subjects the hammers to the possibility that the head may come loose from the handle, that shock and vibration will travel through the handle to the user, or that the user may miss the intended target and instead strike the object with the handle of the hammer instead of the striking face of the head—a so-called over-strike. Over-strike can result in damage to the handle, possibly leading to handle breakage or the head coming loose.

A problem with many hammers and striking tools is that the head comes loose from the handle. Another problem is that while the head is often tough and durable, the handle is subject to breakage, particularly if the user misses the target with the striking face of the hammer and hits the target with the handle instead. Another issue is that a lanyard provided as a safety feature may come loose from the hammer head as a result of handle breakage or damage to the handle in the area of the lanyard hole.

SUMMARY OF THE INVENTION

The present invention provides a striking tool with a handle that includes one or more of the following features: a striking head with deflector surfaces for deflecting mis-strikes, a reinforced lanyard opening in the handle, and a stand surface on the head for standing the hammer between uses. Additional features include an increased length interface between the handle and the head, a vibration damping and over-strike protecting sleeve at the head end of the handle. The handle is reinforced with a number of rods extending along its length, which rods are anchored in the head and which secure the lanyard opening in the handle.

BRIEF DESCRIPTION OF THE DRAWINGS

FIG. 2 is a side elevational view of the head of the hammers of FIG. 1;

FIG. 3 is a perspective view of the hammer head of FIG. 2;

FIGS. 5a and 5b are side and top views, respectively, of the reinforcing rods that are within the handle of the present hammer, showing the formation of the lanyard hold;

FIG. 6 is a perspective view of an alternative embodiment of a structure for forming the lanyard hole in the hammer handle;

FIG. 7 is a side cross sectional view of an alternate embodiment of the hammer head including an anti-rotation plate; and FIG. 8 is a perspective view of the anti-rotation plate of FIG. 7.

DETAILED DESCRIPTION OF THE PREFERRED EMBODIMENTS

Figure 1:
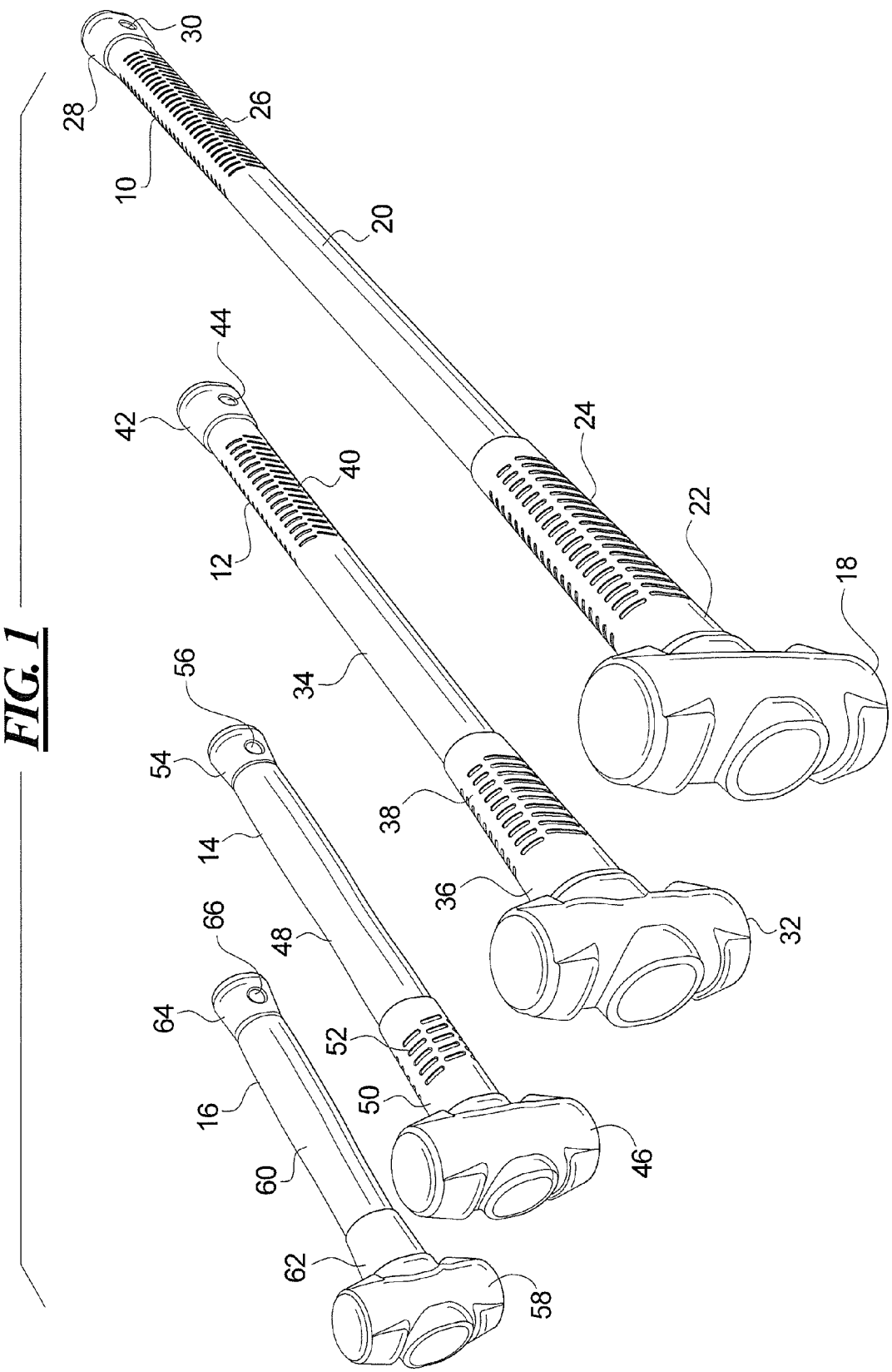
FIG. 1 is an perspective view showing four different sized embodiments of the present hammer.

Referring first to FIG. 1, various sizes of hammers 10, 12, 14 and 16 are provided according to preferred embodiments of the present invention. The principles of the present invention may however, be applied to hand tools and striking tools of many types, configurations and designs, including a mallet, cross pein hammer, ball pein hammer, claw hammer, maul, sledge hammer, axe, adze, pick, or other tool. In the heavy duty hammers of FIG. 1, the hammers vary in size and weight, in handle length and shape, and in the grip configuration. However, the hammers also share common elements, including the head configuration, handle construction, and lanyard opening.

The hammer 10 of FIG. 1 is the largest illustrated. It has a hammer head 18 mounted on a handle 20. The head configuration will be described hereinafter. The handle 20 extends from the head 18 as a generally elongated shaft that is somewhat flattened laterally to provide a comfortable grip for the user. Adjacent the head 18 is a sleeve or collar 22 that tapers from a larger diameter adjacent the head 18 to a smaller diameter. The sleeve or collar 22 has a textured surface 24 to provide an enhanced grip for the user who chooses to grip the hammer near the head. The enhanced grip surface 24 of the illustrated embodiment is formed by an arrangement of depressions formed into the material of the sleeve 22. The arrangement of depressions are in the central portion of the sleeve 22. The sleeve or collar 22 may be of the same material as the material of the handle 20 or of a different material and may be made in one piece with the handle 20 or made separately and assembled onto the handle 20.

The handle 20 of the larger hammer 10 has a second grip enhancing surface 26 adjacent the end further from the head 18. The second grip enhancing surface 26 is also formed by an arrangement of depressions formed into the material of the handle 20. Both grip enhancing surfaces 24 and 26 includes rows of elongated depressions extending generally axially of the handle 20 with the elongate extent of each depression extending generally transverse to the handle or at an angle thereto. The illustrated grip surface has been found to enhance user grip by increasing friction when both wet and dry but without injury to the user's hands.

The end of the handle 20 farthest from the head 18 includes an enlargement 28 that flares outward to a greater diameter than the body of the handle 20. The enlargement 28, also referred to as a flared tail, helps to prevent the hammer 10 from slipping from the user's hands should the user's hand slip on the handle 20. Also at the end of the handle 20 is a hole or opening 30 through which may be attached a lanyard (not shown) or other securing means. The lanyard opening 30 extends through the handle 20 and may be used to hang the hammer from a nail, spike or hook. The enlarged flare or flared tail 28 may be formed of the same material as the handle 20 and formed in one piece with the handle, or may be of a different material and formed separately.

FIG. 1 also shows a smaller hammer 12 that has a smaller and lighter head and shorter handle than the hammer 10. The hammer 12 has a head 32 and a handle 34. The handle 34 includes a sleeve or collar 36 with a textured grip surface 38 adjacent the head 32. The sleeve 36 and grip surface 38 are shorter than on the hammer 20. A grip surface 40, albeit shorter than on the hammer 10, and flared enlargement 42 are provided at the end of the handle 34 opposite the head 32. A lanyard hole 44 is provided through the handle 34.

A still smaller hammer 14 in FIG. 1 has a head 46 and a handle 48. The handle 48 has a sleeve or collar 50 adjacent the head 46 with a grip portion 52 formed by depressions in the sleeve 50. In this embodiment, the grip portion 52 is rather small compared to the larger embodiments of the hammer. At the end of the hammer 14 opposite the head 46 is a flared enlargement 54 with a lanyard hole 56 for securing or hanging the hammer. The handle 48 lacks the grip enhancing surface formed of an arrangement of depressions adjacent the end opposite the head 46.

The smallest hammer 16 of the illustrated embodiments in FIG. 1 has a head 58 and a handle 60. The handle 60 includes a sleeve or collar 62 adjacent the head formed by a tapering element extending from the head and a distance along the handle. The sleeve 62 is relatively short compared to the longer sleeves of the other hammer embodiments and lacks entirely the arrangement of depressions forming the grip enhancing surface. The handle 60 does include a flared enlargement 64 and a lanyard hole 66 at the end opposite the head 58.

In all of the illustrated hammer embodiments, the outer surface of the handle is formed of molded rubber and in a preferred embodiment of vulcanized rubber formed in a two piece mold in a 1,000 ton compression press. The rubber compound of one example is a synthetic oil resistant rubber with a hardness of 55 Rc that is processed at 150 degrees C. and is vulcanized for five minutes.

The ends of the handles 20, 34, 48 and 60 opposite the heads is perpendicular to the length of the handles in the illustrated embodiments. It is also foreseen that the handle ends may be angled relative to perpendicular, for example at 10 degrees. The molded handle provides a convenient location for a molding, printing or otherwise marking a company name or logo and/or other information on the hammer.

The tapered sleeves or collars 22, 36, 50 and 62 on the hammers provide vibration damping to help prevent the transmission of vibrations from the head to the handle, thereby making the hammer less tiring for the user. The sleeve or collar provides an ergonomic benefit in that the user may grip the hammer by the collar or sleeve, for example, while carrying the hammer. The user who slides one hand along the handle toward the head while swinging the hammer is provided with a grip location on the sleeve or collar as well as the tactile sensation of gripping the tapered sleeve or collar as the user's hand is slid along the handle. The grip enhancing depressions in the sleeve or collar help to prevent slipping during use.

Another benefit of the tapered sleeve or collar is that the greater quantity of material adjacent the head protects the handle from missed strikes or over-strikes by providing impact resistance. Where the sleeve or collar are of a separate material from the handle, the sleeve or collar can be formed of a cushioning or shock absorbing material so that a missed strike that hits the handle instead of the strike face of the hammer is cushioned. In embodiments with the handle and collar molded in one piece of a rubber material, the thickened collar cushions the blow of a missed strike.

In examples of the hammers, the illustrated hammers are 36 inches in length, 24 inches, 16 inches and 12 inches, respectively. A handle of length 30 inches is also planned. The head weights vary proportionately with handle length, and in examples are 8 pounds for the 36 inch handle, 6 pounds for the 24 inch handle, 4 pounds for the 16 inch handle and 2.5 pounds for the 12 inch handle. Of course, other handle lengths and head weights may be provided as well.

Turning to FIG. 2, a head 70 of a 10 pound hammer is depicted. The hammer head 70 has two opposed striking faces 72 and 74 at opposite ends of a generally cylindrical or barrel shaped body 76. The striking faces 72 and 74 may be flat or other shapes but in the illustrated embodiment they are domed with a six inch radius with a chamfer around the edges. Adjacent the striking faces 72 and 74 are angled over-strike pads 76, 78, 80 and 82 at both the top and bottom of both striking faces. The raised over-strike pads 76-82 take glancing blows and deflect the intended target from striking the handle or stand platform (discussed hereinafter) when the target is missed by the striking face. The raised over-strike pads 76-82 also provide balance to the hammer head 70. The over-strike pads 76-82 doe not extend to the sides of the hammer head 70 so as to permit the head to be used in close quarters to strike a target close by a wall or plate, for example.

The over-strike pads 76-82 of one example include deflecting surfaces 84 at an angle of 11.9 degrees to the axis of the barrel shaped head 70, although other angles are of course contemplated and within the scope of this invention. The deflecting surfaces curve about the barrel shaped head along their extent. The deflecting surfaces 84 are smooth and may be polished or partially polished to permit glancing blows to more easily slide over the surface. The deflecting surfaces 84 may be marked with indicia, such as by being marked with the weight of the hammer head 70. In one example, the weight of the hammer head is marked by cast impressions in the deflecting surfaces 84 to indicate the weight in both metric and Imperial measure. Chamfered edges 86 are provided along the perimeter of the raised over-strike pads.

The hammer head 70 includes a sleeve projection 88 at the bottom of the head into which the handle extends. The over-strike pads 78 and 80 protect the sleeve projection 88 from being struck by the target in the event of a missed hammer strike. The top of the barrel shaped hammer head 70 may be rounded of as a continuation of the cylinder or barrel shape, but in a preferred embodiment the top includes a raised stand platform 90. The stand platform 90 provides a surface by which the hammer may be stood with the handle extending in a vertical direction when the hammer is placed on it's head. The user may set the hammer down with the handle in a convenient position for grasping without requiring that the hammer be laid over on it's side.

In FIG. 3, the hammer head 70 of FIG. 2 includes the barrel shaped body 76 with opposing strike faces 72 and 74 and over-strike pads 76, 78, 80 and 82. The weight of the hammer head is marked by cast impressions in the over-strike pads 76 and 82 on the top of the head 70 with the metric and Imperial weight of the head. Other means of providing indicia may be provided instead, or the head may remain unmarked. The over-strike pads 78 and 80 on the bottom of the head 70 may remain unmarked or may be provided with markings or indicia, as desired.

The raised stand platform 90 includes a rim 92 that surrounds the through opening and extends from the head in a direction opposite the handle to define a surface on which the hammer may be stood. When the hammer is stood on the stand platform 90 by resting the stand platform on a surface, the hammer is disposed with the handle extending upward in an easy to grasp position. The rim 92 encircles a through opening 94 in the head 70 in which the handle is secured. In a preferred embodiment, the rim 92 is continuous about the opening although embodiments are envisioned that are discontinuous, for example, providing legs or feet on which to stand the hammer head. The through opening 94 includes a shelf 96 that is used for securing the handle to the head, as will be described. In the view of FIG. 3, flattened sides 98 of the raised stand platform 90 are apparent, giving the stand platform 90 and the opening 94 an elliptical shape. The elliptical shape is also the shape of the handle, although other handle shapes are also possible.

The over-strike pads 76, 78, 80 and 82 are shaped to deflect missed strikes away from the raised stand platform 90 and the sleeve projection 88. Not only do the angled deflecting surfaces 84 direct missed strikes away from the platform 90 and sleeve projection 88 but the angled sides 100 of each over-strike pad 76, 78, 80 and 82 also deflect missed strikes from the handle and the platform 90 and sleeve projection 88.

The barrel shaped body 70 of the head provides a greater length or extent of through opening 94 for securing to the handle than a traditional square or octagon shaped hammer head. The addition of the sleeve projection 88 and stand platform 90 to the bottom and top, respectively, of the hammer head 70 further extends the length of the through opening. A greater length of through opening for the handle provides a greater interface between the hammer head and the handle, which results in a greater resistance to torque between the head and the handle and a greater resistance to rotating during use.

The hammer head of one example is formed of steel, and in particular of a fine grain forging quality steel that has been heat treated to 44-55 Rockwell "C". The heat treatment of the striking faces is by induction methods. The steel composition of one example is 0.45-0.85% Carbon, 0.10-0.30% Silicone, 0.20-0.90% Manganese, 0.05% max Sulphur, 0.04 max Phosphorus, balance Iron, according to US Federal Specification GGG-H-86c. The exterior surfaces, and in particular the side surfaces of the barrel shaped head 70 may be painted or otherwise coated or treated, or may remain bare.

Figure 4:
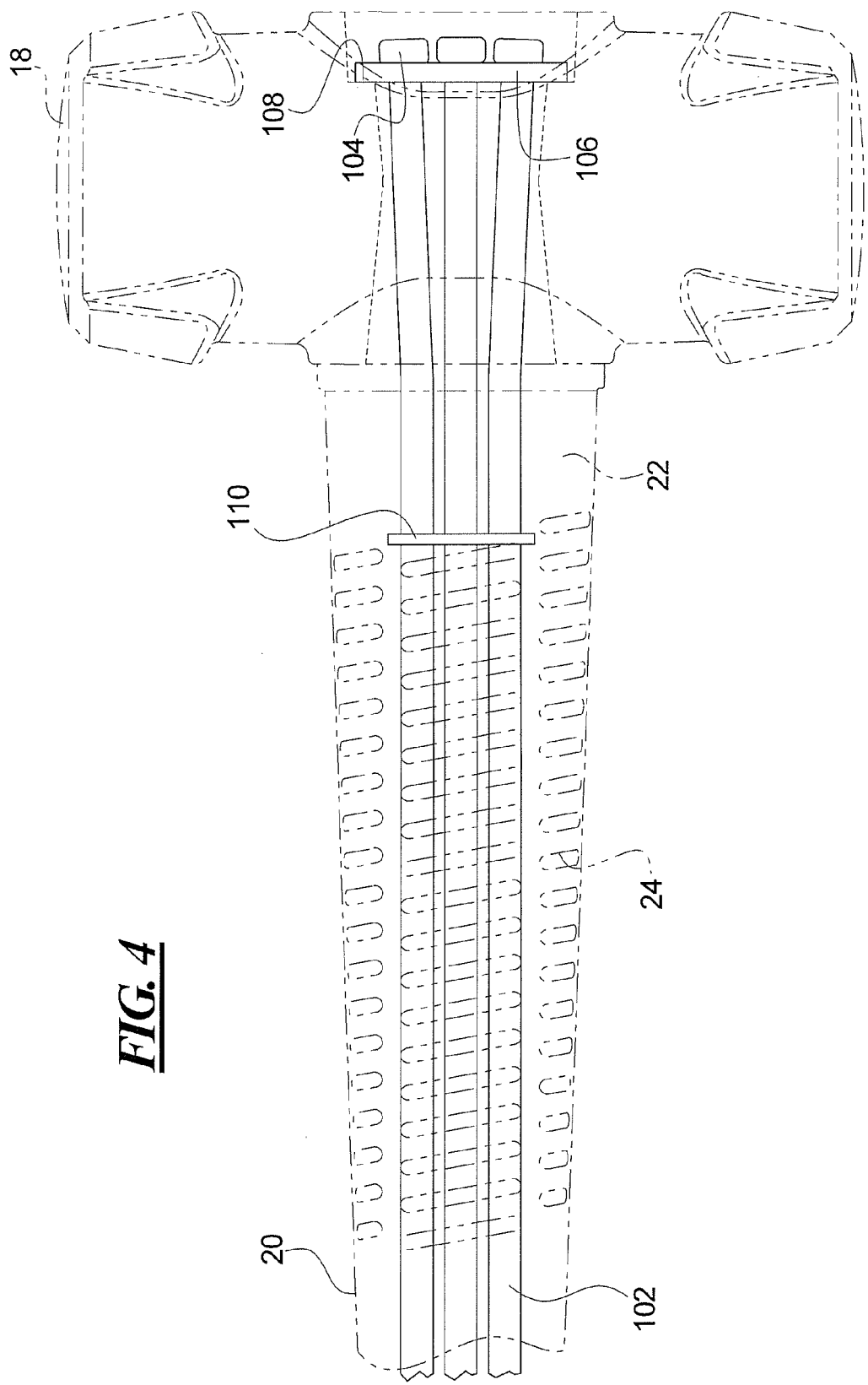
FIG. 4 is a side elevational view of the hammer head and an upper portion of the handle and showing reinforcing rods within the head and handle in phantom.

In FIG. 4, the connection between the handle 20 and the hammer head 18 is shown for example for the hammer 10 of FIG. 1. In particular, the handle 20 includes a number of elongated rods 102 that extend the length of the handle or at least substantially the length of the handle. The rods 102 pass through openings in a plate 106 that is mounted within the head 18 and are secured to the plate 106. In the preferred embodiment, the rods 102 each have an enlarged head 104 that rests on the plate 106 and prevents the rod from being pulled through the hole in the plate 106. The plate 106 rests on a shelf 108 within the through opening of the hammer head 18. The shelf 108 is comparable to the shelf 96 in the hammer head 70 shown in FIG. 3. The plate 106 is mounted relatively high in the head 18 so that the rods 102 extend through most of the through passage to provide a large interface between the handle 20 and the head 18. Preferably, the enlarged heads 104 on the rods 102 prevent the rods from being pulled through the plate 106, and the shelf 108 prevents the plate 106 from being pulled through the hammer head 18. As can be seen in FIG. 4, the rods bend outward slightly from each other within the head 18 as a result of the greater spacing of the holes in the plate 106 to accommodate the enlarged heads 104 on the rods 102.

The rods 102 of one embodiment are formed of spring steel. In other embodiments, the rods 102 may be formed of fiberglass, carbon fiber, aramid, or other materials. The rods may be formed by pultruding, in other words, pulling continuous fibers of glass, carbon, aramid or other material through a resin bath to saturate the fibers and then pulling the resin saturated fibers through a heated die that cures the resin and forms the rods into shape. The fiber and resin rods would decrease the weight of the handle compared to the spring steel rods, while retaining the strength and restorative flexibility of the spring steel rods. Any rod with a high aspect ratio and a significant stiffness can be used. The rods 102 can be cylindrical, hexagonal, or other shapes as desired.

The rods 102 are bundled in the handle 20 and are maintained in their relative spacing by the plate 106 as well as by spacer plates 110 that are disposed at intervals along the rods 102. The spacer plates 110 have a hole for each rod 102 and are slid into place on the rods 102 as the handle 20 is being manufactured. Preferably, several spacer plates 110 are provided within the handle 20, the number generally being dependent on the length of the handle. In other words, a greater number of such spacer plates is found in the long handle 20 of the hammer 10 in FIG. 1 than in the short handle 60 of hammer 16. The spacer plates 110 are not welded or otherwise secured to the rods 103 other than by being molded within the rubber material of the handle 20. This permits the rods 102 to slide in the holes of the spacer plates 110 as the bundle of rods 102 flexes during hard use of the hammer. The sliding movement of the rods 102 in the spacer plates 110 permits the handle 20 to return to its original shape rather than being permanently deformed when subject to sever bending forces. The spacer plates 110 help to distribute the load between each of the spring steel rods 102 during hard use.

In a preferred embodiment, six rods 102 are provided in the handle 20 of the hammer, arranged in two rows of three rods. The arrangement of two rows of three rods fits within the elliptical handle while encasing the rods with the rubber material of the handle. Other numbers or arrangements of rods are also possible.

The tapered collar 22 of the handle 20 with the grip enhancing depressions 24 is visible in FIG. 4.

To manufacture the hammer and handle combination, six rods 102 are inserted though corresponding holes in the plate 106 and the rods are inserted through the opening in the hammer head 18 to seat the plate 106 on the shelf 108. The spacer plates 110 are slid into place on the rods 102 at spaced locations along the rods. The rods 102, and potentially the hammer head 18, are heated to permit the hot fluid rubber to flow between and along the rods and into the interior of the head. The rubber is injected into a two part mold containing the heated rods 102. The rubber is subject to a vulcanization process to toughen it. After removing the hammer from the mole, the resulting hammer has a tough rubber handle with a core formed by a bundle of spring steel rods forming a durable but flexible structure.

The handle of each hammer has a lanyard hole through which may be fastened a lanyard, rope, cord, strap or other securing means and through which may be placed a hook, spike, nail, or other projection for hanging the hammer. A preferred lanyard hole is shown in FIGS. 5a and 5b. In the side view of FIG. 5a the bundle of rods 102 within the handle 20 is shown with a spacer plate 110 that maintains the arrangement of rods 102 by holes in the plate 110. A second to last spacer plate 112 is provided near the end of the handle just before the middle two rods 114 end. The outer four rods 116 extend beyond the end of the middle rods 114 and an endmost spacer plate 118 is fastened to the longer rods 116. The endmost spacer plate 118 of a preferred embodiment is tack welded to the rods 116, although other fastening methods may be provided instead.

The result of the longer outer rods 116 being fastened to the endmost spacer plate 118 is that a gap is formed in the reinforcing structure of the handle. As indicated by a hatched cylinder 120 in the gap, the cylinder 120 is part of the mold which forms the handle during molding so that the resulting opening when the mold and cylinder 120 are removed form the lanyard hole. The lanyard hold is enclosed by the four outer rods 116, the shorter rods 114 and spacer plate 112, and the welded endmost spacer plate 120.

In FIG. 5b, the bundle of rods 102 is shown from above with the cylinder 120 in place extending through the gap left by the shorter middle rods 114. The rubber handle will be over-molded on the bundle of rods shown in FIGS. 5a and 5b to form reinforced handle and lanyard opening of the hammer or other tool. The lanyard hole is prevented from being pulled out of the hammer handle by the surrounding reinforcements.

Although the preferred method and structure for forming the lanyard hole in the handle is shown in FIGS. 5a and 5b, an alternative structure for a lanyard hole is shown in FIG. 6. A spacer plate 122 is provided near the ends of the rods 102 within the handle prior to over-molding of the handle material on to the rods. The spacer plate 122, which will enclosed within the material of the handle in the finished hammer, includes a leg 124 that extends from one side of the spacer plate 122 and is bent at a right angle to the spacer plate 122. The leg 124 is parallel to the bundle of rods 102 and extends beyond the ends of the rods 102. In this embodiment, all of the rods 102 are the same length. Just beyond the ends of the rods 102, the leg 124 is bent at a right angle at a knee 126 that has a length of about one rod diameter or more, and then the plate is bent in a reverse direction to form a foot 128. The foot 128 includes a hole 130 where the lanyard hole is formed in the finished handle.

To form the handle, a cylinder is inserted through the hole 130 in the foot 128 and the rubber material is over-molded over the rods and the spacer plate 122 so that the rods and spacer plate are enclosed within the handle. A strong pulling force on the lanyard hole 130 results in the spacer plate 122 being pulled from one side by the leg 124 so that the spacer plate is pulled off center. The holes in the spacer plate tilt, digging into the rods 102 and gripping the rods 102. This gripping of the rods 102 by the spacer plate 122 prevent the lanyard hole from being pulled from the hammer. The over-molded rubber encasing the handle provides a further resistance to the lanyard hole being pulled from the hammer.

FIG. 7 shows an embodiment of the mounting between the hammer head and the handle that further strengthens the connection and provides additional resistance to rotation between the two components. In particular, the head 18 is the same or similar to the head of FIGS. 2-4, with the handle 22 attached thereto and connected by rods 102. The plate 106 through which the rods 102 extend has the heads 104 of the rods pulling the plate 106 onto the shelf 108 in the head 18. The difference is that in this embodiment a second plate 140 is mounted on the rods 102 within the head 18. The plate 140 is positioned within the through opening 94 where it acts to resist pivoting of the rods 102 within the head and thereby prevents rotation between the handle 22 and the head 18. The second plate 104 may rest on a shelf in the head like the plate 108, but in the illustrated embodiment is wedged into the tapered through opening 94. By being wedged into the tapered opening, the second plate is assured of a tight fit to the head so as to prevent movement between the handle and the head.

FIG. 8 shows an example of the second plate 140. The plate 140 is U-shaped with an opening 142 so that it can be positioned onto the bundle of rods 102 after they have been positioned through the plate 106 and mounted in the head 18. The opening 142 of the plate 140 is slid onto the bundle of rods 102 from the side and the plate 140 is slid along the bundle into the through opening 94 of the head 18. The rubber or other material of the handle is then molded over the rods and spacer plates to form the finished handle. It is also possible that the plate 140 may have holes through which the rods extend or be of some other shape.

The second plate 140 is wider than the spacer plates 110 that are spaced along the handle 22 so that it engages within the through opening 94. It is possible to size the spacer plates 110 and the through opening 94 so that the spacer plates can pass through the through opening while on the bundle of rods 102 during assembly of the present hammer. The bundle of rods is formed by threading onto the rods the top plate 102 and the spacer plates 110 and even by welding on the lanyard plate 118. The assembled bundle is then passed through the passage 94 in the head 18 and the second plate 140 is fit onto the bundle and slid into place within the head 18. The handle material is then molded onto the handle.

Where a second plate 140 is not used, the bundled rods 102, top plate 106 and spacer plates 110 are inserted into the head and the handle 22 is molded thereon.

The handle resulting from the disclosed construction has a flexible core structure that provides both strength and durability. The lanyard hole is secured in the structure of the handle to prevent it from being pulled out, even under extreme conditions. The handle and the hammer head are affixed to one another in a way to prevent rotation, loosening or removing of the head from the handle. A very tough and durable hammer suitable for the heaviest jobs results.

Although other modifications and changes may be suggested by those skilled in the art, it is the intention of the inventors to embody within the patent warranted hereon all changes and modifications as reasonably and properly come within the scope of their contribution to the art.

We claim:

1. A hand tool, comprising:
   a head defining a through opening and a working portion;
   a handle connected to said head at said through opening;
   a plurality of rods extending within said handle and having a first end extending into said through opening, said first ends of said rods each having an engagement portion mounted within said through opening, said plurality of rods each having a second end;
   a first spacer plate defining a plurality of openings, said first spacer plate being mounted on said plurality of rods spaced from said second end;
   a second spacer plate affixed on ones of said plurality of rods to define a gap between said ones of said rods, said gap defining a lanyard opening of said handle, said second spacer plate being spaced from said first spacer plate;
   wherein said ones of said plurality of rods affixed to said second spacer plate are longer rods; and further comprising:
   at least one shorter rod disposed between said longer rods, said at least one shorter rod having a first end mounted within said through opening of said head and having a second end extending through said first spacer plate, said second end being free of said second spacer plate so that a gap is defined between said second end of said shorter rod and said second spacer plate.

2. A hand tool as claimed in claim 1, wherein said handle includes a material cast over said plurality of rods to form a grip.

3. A hand tool as claimed in claim 1, wherein said plurality of rods is six rods, wherein four of said rods are said longer rods affixed to said second spacer plate and two of said rods are shorter rods having said second end spaced from said second spacer plate.

4. A hand tool as claimed in claim 1, wherein said head is a hammer head.

5. A hand tool as claimed in claim 1, further comprising:
   a collar on said handle adjacent said head, said collar extending a distance along said handle to shield said handle from an over-strike.

6. A hand tool as claimed in claim 5, wherein said collar includes an arrangement of depressions formed into said collar as a grip surface.

7. A hand tool as claimed in claim 1, wherein said head is one of a sledge hammer head, a cross pein hammer head, a ball pein hammer head, a claw hammer head, an axe head, a hatchet head, a mallet head, and a pick head.

8. A hand tool, comprising:
a head defining a through opening and a working portion;
a handle connected to said head at said through opening;
a plurality of rods extending within said handle and having a first end extending into said through opening, said first ends of said rods each having an engagement portion mounted within said through opening, said plurality of rods each having a second end;
a first spacer plate defining a plurality of openings, said first spacer plate being mounted on said plurality of rods spaced from said second end;
a second spacer plate affixed on ones of said plurality of rods to define a gap between said ones of said rods, said gap defining a lanyard opening of said handle, said second spacer plate being spaced from said first spacer plate;
wherein said head is a hammer head;
wherein said hammer head includes a striking face, and further comprising:
a deflecting pad adjacent said striking face and extending from said hammer head at an acute angle to a perpendicular to said striking face.

9. A hand tool as claimed in claim 8, wherein said deflecting pad includes two deflecting pads, a first of said deflecting pads disposed on a side of said hammer head in a direction of said handle and a second of said deflecting pads disposed on a side of said hammer head opposite a direction of said handle.

10. A hand tool as claimed in claim 8, wherein said hammer head includes two striking faces and includes at least one said deflecting pad adjacent each of said striking faces.

11. A hand tool, comprising:
a head defining a through opening and a working portion, said head being of a generally cylindrical shape with said through opening extending transvers to an axis of a cylinder of the cylindrical shape;
a handle connected to said head at said through opening and extending in a first direction from said through opening;
a plurality of rods extending within said handle and having a first end extending into said through opening, said first ends of said rods each having an engagement portion mounted within said through opening, said plurality of rods each having a second end;
a first spacer plate defining a plurality of openings, said first spacer plate being mounted on said plurality of rods spaced from said second end;
a second spacer plate affixed on ones of said plurality of rods to define a gap between said ones of said rods, said gap defining a lanyard opening of said handle, said second spacer plate being spaced from said first spacer plate;
wherein said through opening in said head is provided with a projecting rim extending from the cylindrical shape of the head in a direction opposite the first direction of said handle, said projecting rim defining a standing surface by which said hand tool may be stood with said handle extending substantially vertical.

12. A hand tool as claimed in claim 11, wherein said projecting rim is a continuous rim around said through opening.

13. A hand tool, comprising:
a head defining a through opening and a working portion;
a handle connected to said head at said through opening;
a plurality of rods extending within said handle and having a first end extending into said through opening, said first ends of said rods each having an engagement portion mounted within said through opening, said plurality of rods each having a second end;
a first spacer plate defining a plurality of openings, said first spacer plate being mounted on said plurality of rods spaced from said second end; and
a second spacer plate affixed on ones of said plurality of rods to define a gap between said ones of said rods, said gap defining a lanyard opening of said handle, said second spacer plate being spaced from said first spacer plate;
wherein said plurality of rods includes six rods disposed in a 2 by 3 arrangement.

14. A hand tool as claimed in claim 13, further comprising:
a flared end of said handle opposite said head.

15. A hand tool as claimed in claim 13, wherein said end of said handle opposite said head is at an angle to perpendicular.

16. A set of hand tools, comprising:
plurality of hand tools, each of said hand tools including:
a head having a through opening and a working face;
a handle connected to said head at said through opening;
a plurality of rods extending along and within said handle and into said through opening, said plurality of being secured in said through opening to said head, said plurality of rods in each of said plurality of hand tools including a handle having six rods in a 2 by 3 arrangement;
said handle of each of said hand tools defining a lanyard opening;
first and second spacer plates within said handle being mounted on said plurality of rods and defining a space between said spacer plates, said lanyard opening extending through said space between said spacer plates;
each of said hand tools being distinguished from one another by different respective handle lengths.

17. A hammer, comprising:
a head having a striking face;
a handle affixed to said head;
said head including angled deflecting pads adjacent said striking face of said head, said deflecting pads having deflecting faces disposed at an acute angle to a perpendicular to said striking face, at least one of said deflecting pads being disposed on said head at a position to deflect over-strikes from said handle.

18. A hammer as claimed in claim 17, further comprising:
a stand surface projecting from said head opposite said handle, said stand surface defining a surface substantially perpendicular to a longitudinal extent of said handle so that said hammer may be stood on said stand surface with said handle projecting upwardly.

19. A hammer as claimed in claim 18, wherein said head includes a through opening at which is mounted said handle, and said stand surface is a raised rim about said through opening.

20. A hammer as claimed in claim 18, wherein said head is generally barrel shaped or cylindrical in shape and said stand surface extends from a side of said barrel shape or cylinder.

21. A hand tool, comprising:
a head defining a central recess and a working portion;
a handle connected to said head at said central recess;
a plurality of rods extending through said handle and into said central recess of said head, said rods each having an engagement portion at an end of said rods in said central recess to anchor said rods in said head;

a lanyard plate having a first portion defining a plurality of bores through which respective ones of said plurality of rods extend, said first portion being disposed substantially perpendicular to axes of said plurality of rods, said lanyard plate having a second portion extending substantially parallel to axes of said plurality of rods, said second portion defining a lanyard hole, said first portion of said lanyard plate being connected to said second portion of said lanyard plate at a perimeter of said first portion, said first portion of said lanyard plate being connected to said second portion of said lanyard plate externally of said plurality of rods;

said handle including an encasing material that encases said plurality of rods and at least said first portion of said lanyard plate.

22. A hand tool as claimed in claim 21, wherein each rod of said plurality of rods is substantially straight and unbent along its full length.

23. A hand tool, comprising:
a head defining a central recess and a working portion;
a handle connected to said head at said central recess;
a plurality of rods extending through said handle and into said central recess of said head, said rods each having an engagement portion at an end of said rods in said central recess to anchor said rods in said head;
a lanyard plate having a first portion defining a plurality of bores through which respective ones of said plurality of rods extend, said first portion being disposed substantially perpendicular to axes of said plurality of rods, said lanyard plate having a second portion extending substantially parallel to axes of said plurality of rods, said second portion defining a lanyard hole;
said handle including an encasing material that encases said plurality of rods and at least said first portion of said lanyard plate;
wherein said lanyard plate includes a third section extending substantially parallel to said plurality of rods and a fourth section extending substantially perpendicular to said plurality of rods, said third and fourth sections being connected between said first and second sections of said lanyard plate.

24. A hand tool as claimed in claim 23, wherein said plurality of rods includes six rods disposed in a two rows of three rods, and wherein said third section of said lanyard plate extends adjacent one of said rows of three rods.

25. A method of making a hand tool, comprising the steps of:
forming a head having a handle recess and a working face;
mounting a plurality of rods in said handle recess of said head;
mounting a plurality of spacer plates on said rods at spaced locations;
heating said rods; and
encasing said rods within a handle material while said rods are heated so as to form a handle that encloses said rods and that is mounted to said head.

26. A method as claimed in claim 25, further comprising the steps of:
affixing one of said spacer plates to said rods so that said rods define a gap between ones of said rods for a lanyard hole; and
casting a lanyard hole in said handle through said gap during said encasing step.

* * * * *